United States Patent [19]

Merkel

[11] Patent Number: 5,790,370
[45] Date of Patent: Aug. 4, 1998

[54] COLLAPSIBLE PORTABLE COMPUTER KEYBOARD STRUCTURE HAVING SPRINGLESS LID-TO-KEYBOARD DRIVE LINKAGE

[75] Inventor: Harold S. Merkel, Houston, Tex.

[73] Assignee: Compaq Computer Corporation, Houston, Tex.

[21] Appl. No.: 871,319

[22] Filed: Jun. 9, 1997

[51] Int. Cl.[6] .................. G06F 1/16; B41J 11/56; H05K 7/04
[52] U.S. Cl. .......................... 361/680; 400/682
[58] Field of Search .................. 361/680; 341/22; 400/490, 682, 488, 691; 200/344, 345; 345/168, 169; 364/708.1

[56] References Cited

U.S. PATENT DOCUMENTS

| | | |
|---|---|---|
| 5,532,904 | 7/1996 | Sellers ........................ 361/680 |
| 5,602,715 | 2/1997 | Lempicki et al. ............ 361/680 |
| 5,635,928 | 6/1997 | Takagi et al. ................ 361/680 |
| 5,654,872 | 8/1997 | Sellers ........................ 361/680 |

*Primary Examiner*—Lynn D. Feild
*Attorney, Agent, or Firm*—Konneker & Smith, P.C.

[57] ABSTRACT

A notebook computer is provided with a collapsible keyboard in which a dome sheet with elastomeric key return dome members thereon is horizontally shiftable through elevation and retraction strokes to respectively shift the keys between elevated operating positions in which the domes underlie and support the keys, and retracted positions in which the domes are shifted away from their key-underlying positions. A springless linkage structure interconnects the dome sheet to a cylindrical hinge area portion of the computer's lid housing which rotates with the lid housing as it is opened and closed. The linkage structure functions to drive the dome sheet through its elevation stroke during an initial portion of the lid housing's pivotal opening movement, and to drive the dome sheet through its retraction stroke during a terminal portion of the lid housing's closing movement. Force is exerted on the dome sheet by the springless linkage structure only during forced pivotal movement of the lid housing.

36 Claims, 3 Drawing Sheets

ND5,790,370

COLLAPSIBLE PORTABLE COMPUTER KEYBOARD STRUCTURE HAVING SPRINGLESS LID-TO-KEYBOARD DRIVE LINKAGE

CROSS-REFERENCE TO RELATED APPLICATION

This application discloses subject matter similar to that illustrated and described in U.S. Pat. No. 5,602,715 to Lempicki et al which is hereby incorporated by reference herein in its entirety.

BACKGROUND OF THE INVENTION

1. Field of the Invention

The present invention generally relates to electronic devices and, in a preferred embodiment thereof, more particularly relates to keyboard structures f or portable computers such as notebook computers.

2. Description of Related Art

In recent years the notebook computer has made considerable gains in both popularity and technical sophistication. One factor contributing to the increasing popularity of the notebook computer is its ever decreasing size and weight, a factor arising from the ability to fabricate various components of the computer in smaller and smaller sizes while, in many instances, increasing the power and/or operating speed of such components.

One continuing challenge in the design of notebook computers, however, is the keyboard structure. This design challenge arises from two conflicting design goals—the desire to even further reduce the size of the keyboard structure, and the desirability of having the notebook computer emulate as closely as possible the size and typing "feel" of a desktop computer keyboard.

There are, of course, two dimensional factors which may be varied to reduce the size of a notebook computer keyboard structure—its horizontal dimensions (i.e., its length and width), and its vertical or thickness dimension. The horizontal dimensions of the keyboard are governed by the number, size, and relative spacing of the manually depressible key cap portions of the keyboard, and various reductions in these three dimensional factors may be utilized to reduce the overall length and/or width of the keyboard. However, as will be readily appreciated, a reduction in these three configurational aspects to gain a keyboard size reduction correspondingly lessens the similarity of the notebook computer keyboard in appearance, key arrangement and typing feel to its desktop counterpart.

Similar restraints are also presented when attempts are made to reduce the overall thickness of a notebook computer keyboard. One possibility which has been investigated and attempted is to simply reduce the keystroke distance in the notebook computer keyboard compared to its desktop counterpart. Using this design technique, the overall thickness of the notebook computer in its closed storage and transport orientation may be correspondingly reduced. However, this thickness reduction in the overall notebook computer, achieved by reducing the keyboard keystroke distance, creates what many users consider to be an undesirably typing "feel" difference compared to the longer keystroke distance typically found in a larger desktop computer keyboard.

Illustrated and described in U.S. Pat. No. 5,602,715 to Lempicki et al. which has been incorporated herein by reference, is a notebook computer which provides a useful thickness reduction in the closed computer without a corresponding reduction in the operative keystroke distance of the keyboard. This very desirable thickness reduction is achieved in the notebook computer illustrated and described in this patent by providing the computer with a collapsible keyboard.

The keys in this collapsible keyboard are supported on scissored linkage arm assemblies. In response to closing of the computer lid housing, resilient key return dome portions of the keyboard are shifted away from their normal underlying relationships with the keys, and the scissored linkage arm assemblies and keys are forcibly retracted to a storage and transport orientation in which the overall thickness of the keyboard structure is reduced by an amount essentially equal to the stroke distance of the keys. When the lid is subsequently opened, the key return domes are horizontally shifted back to their normal underlying relationships with the keys, and the keys and scissored linkage arm assemblies are forced outwardly by the return spring portions to their operating orientations above the resilient key return domes.

The key return domes are carried on the top side of a plastic dome sheet which underlies a monoblock structure upon which the keys are movably supported by their scissored linkage arm assemblies, with the dome sheet defining the top layer of a multi-layer signal pad structure. The dome sheet is shifted along the underside of the monoblock structure to cause the domes to cammingly engage portions of the scissored linkage arm assemblies and elevate the keys from their retracted storage and transport positions to their elevated operating positions.

While the collapsible notebook computer keyboard illustrated and described in U.S. Pat. No. 5,602,715 provides a useful reduction in the keyboard thickness when the keys are retracted to their storage and transport orientations, the keyboard structure carries with the following three disadvantages.

First, the assembly tolerance compensation between the keyboard and the lid structure which creates the requisite shifting of the dome sheet is incorporated in the keyboard and requires that the keyboard achieve its collapsed or retracted position and hold down the keys within a dome sheet translation range of about 5.0 to 6.0 mm. This requirement has proven difficult to meet due to the small space available under the key cap members.

Second, an elongated leaf spring member is used to provide the force on the dome sheet to elevate the keys when the computer lid is opened. The oppositely directed force exerted on the dome sheet to collapse the keys is created by two beak-shaped protrusions on the computer lid housing. When the computer lid is closed, and the keys are collapsed, these lid protrusions keep the sliding dome sheet bar under tension and maintain the leaf spring under compression. These forces place plastic parts under stress for long periods of time and under the many different environmental extremes to which the computer is exposed during transport and storage. This situation increases the risk of product reliability problems due to spring fatigue and stressed or broken plastic parts.

Third, in the sliding dome sheet collapsible keyboard design in U.S. Pat. No. 5,602,715 the sliding bar attached to the dome sheet must extend above the keyboard and under the edge of the computer's lid in order to be operatively engaged by the lid drive beaks during closure. This extension of the keyboard parts adds size and weight to the keyboard, limits the assembly options for securing the keyboard in the computer, and may be less appealing from an aesthetic standpoint than a design which more discreetly conceals the mechanism which collapses and elevates the keys.

It can thus be seen from the foregoing that it would be desirable to provide a portable computer having incorporated therein an improved collapsible keyboard, of the type generally described above, which eliminates or at least substantially alleviates these disadvantages.

SUMMARY OF THE INVENTION

In carrying out principles of the present invention, in accordance with a preferred embodiment thereof, an electronic device, representatively a portable notebook computer, is provided with specially designed collapsible keyboard apparatus. The notebook computer has a base housing on which the keyboard apparatus is carried, and lid mounted on the housing for pivotal movement relative thereto between open and closed positions.

The collapsible keyboard apparatus includes a plurality of keys supported for movement between elevated and retracted positions, and a drivable structure movable in elevation and retraction directions to selectively move the keys between their elevated and retracted positions. Springless linkage means are directly interconnected between the lid and the drivable structure and are operative to move the drivable structure in its elevation and retraction directions in respective response to opening and closing the computer lid. Because the linkage means are operative without springs, no shifting forces are exerted on the drivable structure except when the computer lid is being opened or closed, thereby advantageously eliminating residual shifting forces on the keyboard apparatus during storage, transport and use periods thereof.

In a preferred embodiment of the computer its lid has a rotatable hinge area portion with an exterior side surface slot disposed therein and having an axially ramped longitudinal portion, and a zero pitch, circumferentially extending longitudinal portion. The drivable structure is a dome sheet having disposed on one side thereof a spaced series of elastomeric key return domes, and a drive bar member having a pair of upwardly projecting pins thereon is anchored to the dome sheet.

A keyboard slide member is positioned atop the drive bar member for sliding movement relative thereto in directions transverse to the elevation and retraction stroke directions of the dome sheet. A spaced pair of ramped slots are formed in the keyboard slide member, and the pins on the drive bar member pass upwardly through these slots. The upper ends of the pins pass through slots in a pair of keyboard monoblock structure tabs that overlie the keyboard slide member and restrain it against movement parallel to the elevation and retraction stroke directions. The monoblock tab slots longitudinally extend parallel to the elevation and retraction stroke directions, and restrain the dome sheet against movement transverse thereto.

A CPU cover slide member is retained in a pocket area beneath the top housing wall for sliding movement relative to the base housing in opposite directions transverse to the elevation and retraction stroke directions of the dome sheet. An outwardly projecting tab on the CPU cover slide member is drivingly received in a corresponding slot in the keyboard slide member, and an upwardly projecting pin on the CPU cover slide member is drivably received in the side slot in the rotatable hinge area portion of the computer lid.

During an initial opening movement of the lid, representatively its first 60 degrees of movement, the slot in its rotatable hinge area portion drives the CPU cover slide member and the keyboard slide member parallel to the rotational axis of the lid. This movement, via the interaction of the ramped keyboard slide member slots with the drive bar pins, forces the dome sheet through its elevation stroke to elevate the keyboard keys. During the balance of the lid opening movement, representatively to its 135 degree hinge limit position, the lid exerts no further shifting force on the dome sheet via the springless drive linkage structure.

As the lid is subsequently being closed, the dome sheet remains stationary until the lid pivots through the final 60 degrees of closure movement at which time the ramped slot portion in the cylindrical lid hinge area, via its interaction with the CPU cover slide member pin, drives the CPU cover slide member and keyboard slide member back toward their original positions to thereby drive the dome sheet through its retraction stroke and thus collapse the keyboard key members.

The springless linkage structure provides a variety of advantages over previously proposed structures for elevating and collapsing a portable computer's keyboard keys in response to opening and closing of the computer's lid housing. For example, the force to collapse and elevate the keys is supplied completely by the user's opening and closing of the computer lid. There is no dependency on spring force to effect the forward and rearward shifting of the dome sheet, and there is no residual force on the linkage and dome sheet parts after the lid is opened or closed. More specifically, there is no force exerted by the mechanism on the keyboard for long periods of time during operating or storage conditions. Force is exerted on the keyboard only during brief moments when the keys are being collapsed or elevated. Thus, the risk of keyboard and linkage parts bowing, fatiguing, etc. due to high stress is virtually eliminated.

The design of the linkage structure will work equally well with keyboards in which the dome sheet moves forwardly to elevate the keys and where the dome sheet moves rearwardly to elevate the keys. Thus, keyboards of both designs may be used interchangeably in the same portable computer by simply reversing the ramp direction in the keyboard slide member tab slots. The design will also work for keyboards with various required dome sheet travel distances.

The linkage structure also has a reduced number of parts, allows for customizable force profiles on the keyboard slide's slots to facilitate the implementation of preload on the keys, and has a design which is more favorable to an assembly method which allows the keyboard to be installed as the last part of the computer assembly process.

DETAILED DESCRIPTION

Figure 1:
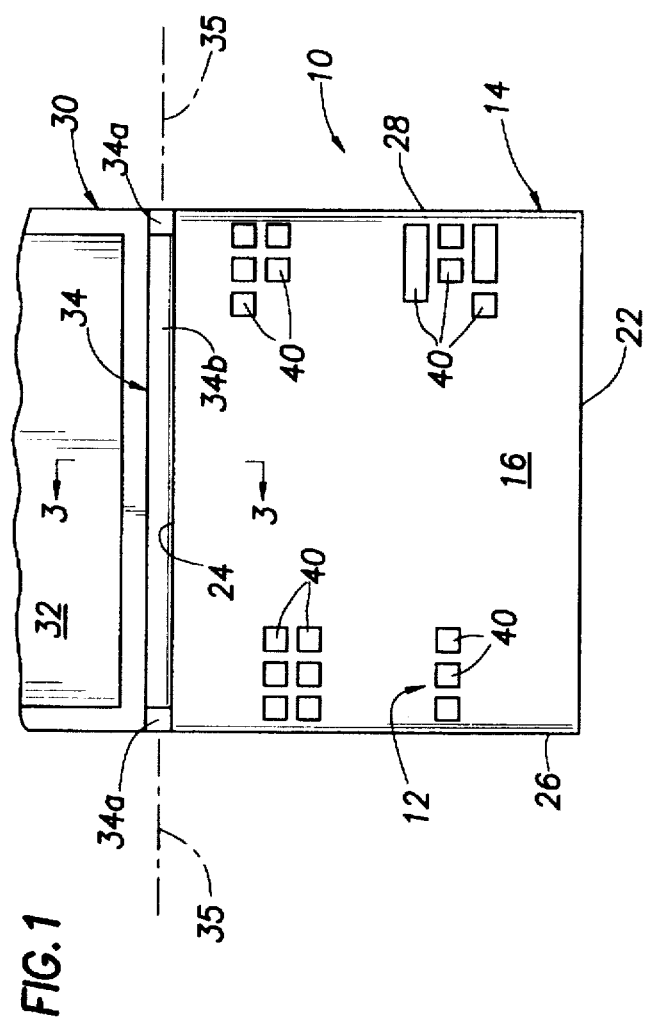
FIG. 1 is a simplified top plan view of a portion of an opened portable notebook computer incorporating therein a specially designed collapsible keyboard structure embodying principles of the present invention.
Figure 2:
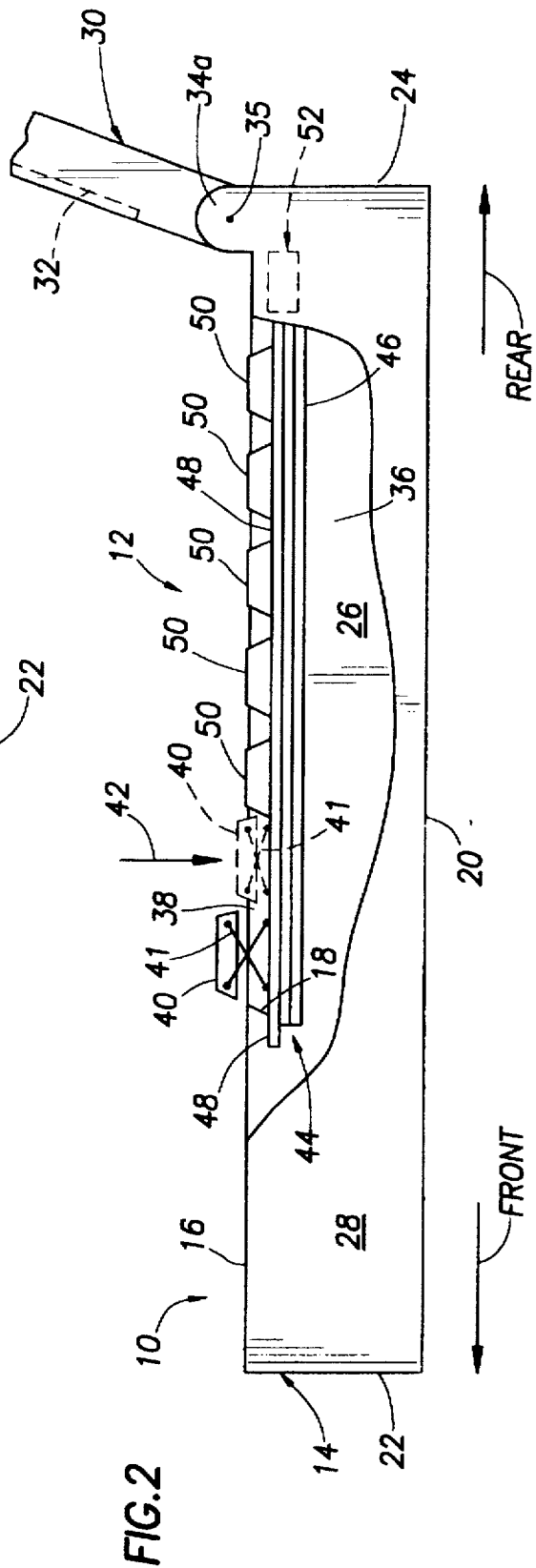
FIG. 2 is an enlarged scale, simplified, partially cut away right side elevational view of the computer.

Referring initially to FIGS. 1 and 2, in a preferred embodiment thereof the present invention provides an electronic device, representatively a portable, notebook type computer 10 which incorporates therein a specially designed collapsible keyboard structure 12 embodying principles of the invention. Computer 10 includes a hollow rectangular base or CPU housing 14 having a top horizontal side wall 16 with an opening 18 therein; a bottom horizontal side wall 20; front and rear vertical side walls 22,24; and left and right vertical end walls 26,28.

A hollow rectangular lid housing 30, having a display screen 32 on its front or inner side, is pivotally secured to a top rear side portion of the base housing by a hinge joint structure 34 that includes a spaced pair of stationary hinge tab portions 34a projecting upwardly from spaced rear corner portions of the base housing 14, and an elongated cylindrical rear side display bezel portion 34b of the lid housing 30 which extends between the tabs 34a and is supported thereby for rotation relative to the base housing 14 about a horizontal axis 35 extending between the tabs 34a.

With the important exceptions noted below, the collapsible keyboard structure 12 is similar to the sliding dome sheet type collapsible notebook computer keyboard structure illustrated and described in the aforementioned U.S. Pat. No. 5,602,715 which has been incorporated herein by reference. As can best be seen in FIG. 2, the collapsible keyboard 12 extends across the opening 18 in the top side wall 16 of the base housing 14 and occupies only a relatively small upper portion of the interior 36 of the base housing 14. The collapsible keyboard structure 12 basically comprises a relatively thin rectangular monoblock support structure 38 that horizontally extends across the base housing top side opening 18 and is suitable anchored to the base housing 14; and a series of manually depressible key cap members each carried by a scissored linkage assembly 41 for vertical movement relative to the monoblock support structure 38 (as indicated by the arrow 42 in FIG. 2) between an elevated solid line use orientation, and a downwardly retracted dotted line storage and transport orientation.

Underlying the monoblock support structure 38 is a multilayer signal pad structure 44 having a bottom layer defined by a metal backing sheet 46, and a top layer defined by a plastic base member or dome sheet 48 which is sandwiched between the bottom side of the monoblock support structure 38 and the balance of the signal pad structure 44. Dome sheet 48 carries on its top side a spaced series of resilient key return spring members representatively in the form of elastomeric dome members 50, and is slidable relative to the stationary monoblock structure 38 and the stationary balance of the signal pad structure leftwardly or forwardly (as viewed in FIG. 2) through a key elevation stroke, and rightwardly or rearwardly (also as viewed in FIG. 2) through a key retraction stroke.

As more fully described in U.S. Pat. No. 5,602,715, the shifting of the dome sheet 48 through its elevation stroke, initiated in response to the opening of the lid housing 30, causes the elastomeric domes 50 to be cammingly driven under the retracted key caps 40 and raise them from their dotted line retracted positions to their solid line elevated operating positions. With the key cap members 40 in these elevated operating positions they may be manually depressed to operatively activate, via their associated domes 50, underlying conventional switch circuitry in the signal pad structure 44. A subsequent reverse movement of the dome sheet 48 through its retraction stroke, initiated by a closing of the lid housing 30, shifts the domes 50 away from their underlying supporting relationships with the key caps 40 and causes the retraction of the key caps 40 to their dotted line storage and transport orientations as more fully described in U.S. Pat. No. 5,602,715 incorporated by reference herein.

As will now be described, the present invention provides a substantially improved drive structure operative to selectively shift the dome sheet 48 through its elevation and retraction strokes. More specifically, the dome sheet 48 is drivably connected to the pivotal lid housing 30 by a specially designed springless linkage structure 52 schematically shown in phantom in FIG. 2. Linkage structure 52, in response to opening the lid housing 30, operates to forwardly shift the dome sheet 48 through its elevation stroke and, in response to closing the lid housing 30, operates to rearwardly shift the dome sheet 48 through its retraction stroke.

Figure 3:
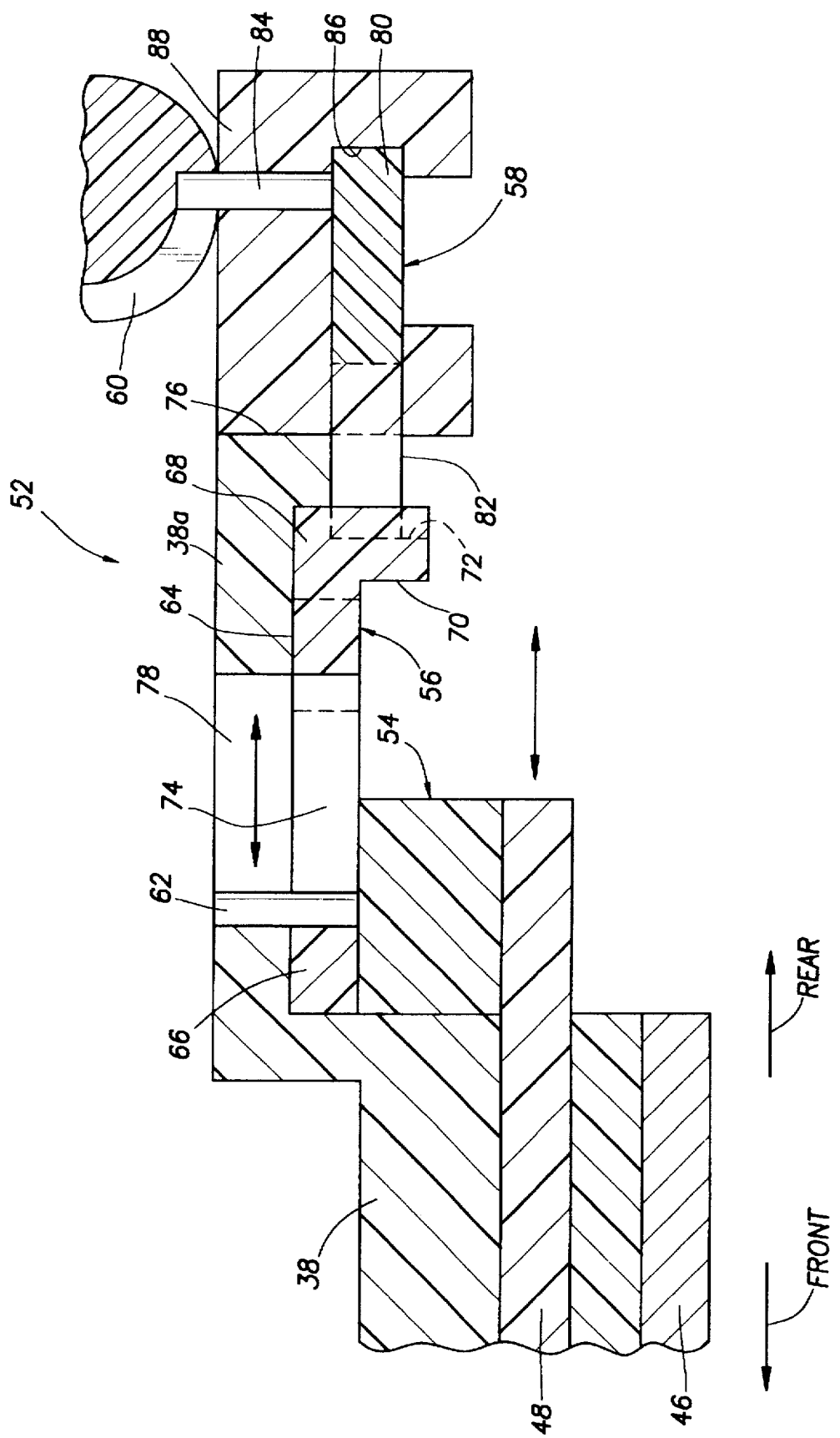
FIG. 3 is an enlarged scale schematic crosssectional view through a drive linkage portion of the collapsible keyboard taken along line 3—3 of FIG. 1.
Figure 4:
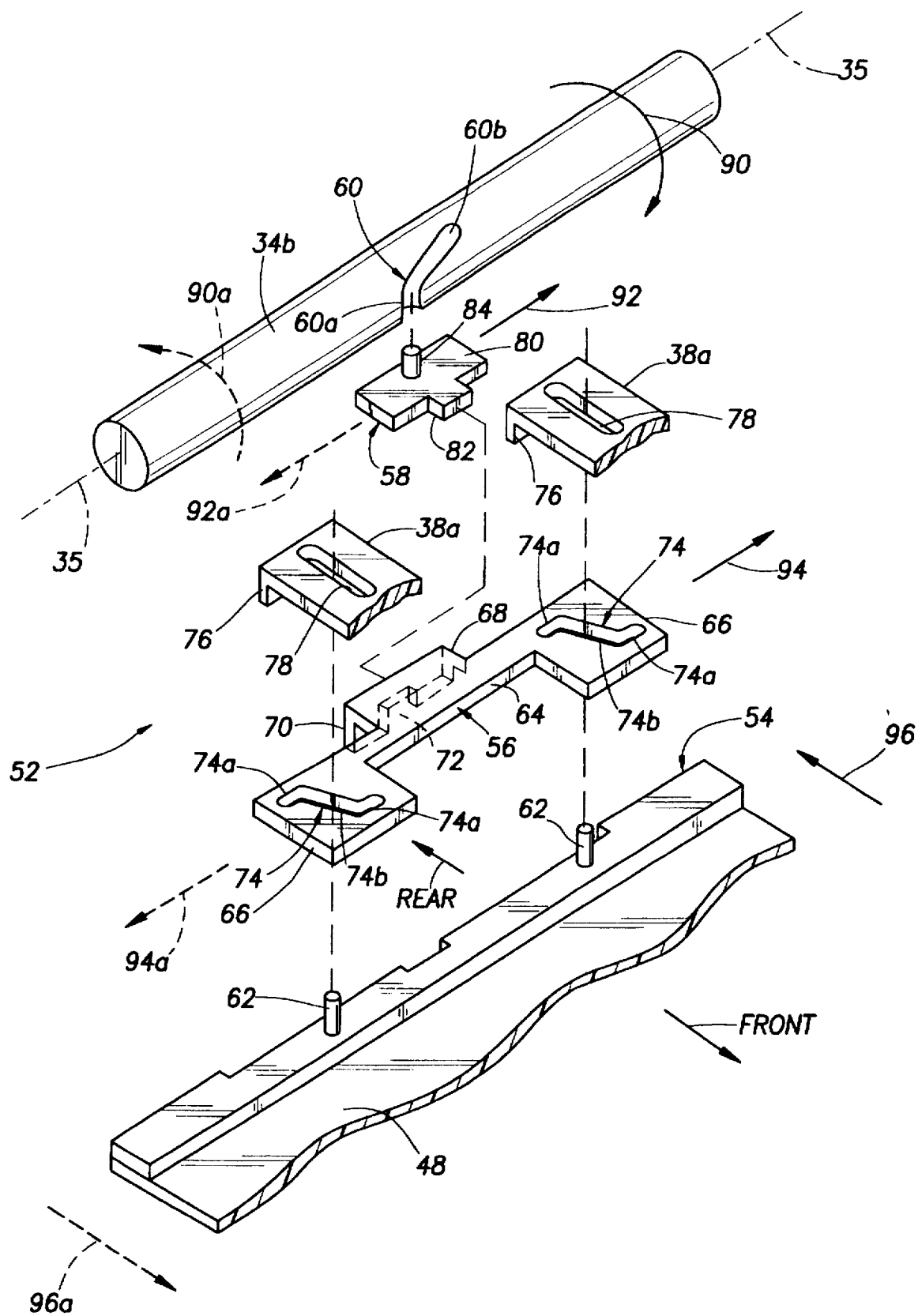
FIG. 4 is an enlarged scale simplified exploded perspective view of the drive linkage.

Referring now to FIGS. 3 and 4, the springless linkage structure 52 includes an elongated drive bar member 54; a keyboard slide member 56; a CPU cover slide member 58; a display bezel slot 60; and a pair of rearwardly projecting tab portions 38a of the monoblock support structure 38.

Drive bar member 54 is anchored to a rear top side portion of the dome sheet 48, longitudinally extends transversely to its front-to-rear direction, and has a longitudinally spaced pair of drive pins 62 projecting upwardly from its top side.

Keyboard slide member 56 has an elongated, platelike rectangular body portion 64 with forwardly projecting tab portions 66 at its opposite ends, and a rearwardly projecting central tab portion 68. Central tab portion 68 has, at its outer end, a downturned lip 70 with a slot 72 formed therein. In each of the forwardly projecting tab portions 66 a slot 74 is formed. Each slot 74 has a pair of oppositely directed end portions 74a that extend parallel to the length of the drive bar 54 and are interconnected by a central slot portion 74b that, as viewed in FIG. 4, is forwardly and rightwardly sloped.

Each of the rearwardly projecting monoblock structure tabs 38a has, at its outer or rear end, a downwardly projecting lip 76. Additionally, in each tab 38a an elongated slot 78 is formed, with the slots 78 longitudinally extending in a front-to-rear direction.

The CPU cover slide member 58 has a rectangular, plate-like body portion 80 from a front side edge of which a central tab 82 forwardly projects. A pin portion 84 projects upwardly from a central rear top side portion of the body 80.

The display bezel slot 60 is formed on a longitudinal central outer side portion of the elongated cylindrical central bezel member 34b. As best illustrated in FIG. 4, the slot 60 has a first end portion 60a which extends circumferentially around a portion of the bezel member 34b in a substantially constant longitudinal location thereon, and a helically sloped end portion 60b.

As indicated in FIGS. 3 and 4, The keyboard slide member 56 slidably rests atop the drive bar member 54, with the drive bar pins 62 extending upwardly through the slots 74 in the keyboard slide member tabs 66. The monoblock structure tabs 38a extend over the top sides of the tabs 66, with the lips 76 of the monoblock tabs 38a extending downwardly along rear side edge portions of the tabs 66, and the drive bar pins 62 extending upwardly through the slots 78 in the monoblock structure tabs 38a.

The body 80 of the CPU cover slide member 58 is captively retained in a pocket area 86 (see FIG. 3) of a top wall section 88 of the base housing 14 behind the monoblock tabs 38a, and is slidingly movable in the pocket 86 in left and right directions as viewed in FIG. 4. The CPU cover member tab 82 is received in the slot 72 in the rear keyboard slide member lip 70, and the upwardly projecting pin 84 on the CPU cover slide member 58 is received in the display bezel slot 60.

With the computer lid housing in its opened, use orientation (representatively at an opened hinge limit angle of about 135 degrees), the CPU cover slide member pin 84 is in the zero pitch display bezel slot portion 60a, the dome sheet 48 and the drive bar member 54 are in their forwardly shifted positions shown in FIG. 3, the drive bar pins 62 are disposed in the forward ends of the monoblock tab slots 78 and in the front end portions 74a of the keyboard slide member slots 74, and the keys 40 (see FIG. 2) are in their elevated solid line positions.

Since the linkage structure 52 is of a unique springless design, there are no appreciable forces being exerted on the linkage structure components or the dome sheet 48 while the lid housing is in this stationary opened position. During an initial closing movement of the lid housing 30 (representatively from about 135 degrees to about 60 degrees relative to the top side of the base housing), the cylindrical bezel portion 34b is rotated in the direction of the solid line arrow in FIG. 4 and the CPU cover slide member pin 84 remains in the zero pitch portion 60. Accordingly, during this initial lid housing closing movement the linkage structure components and the dome sheet 48 remain stationary.

Upon a further closing of the lid housing 30 (i.e., from about 60 degrees to its fully closed position) the cylindrical bezel portion 34b continues to rotate in direction 90, and the CPU cover slide member pin 84 enters the helixed bezel slot portion 60b and is driven rightwardly along its length. This, in turn, drives the CPU cover slide member 58 rightwardly relative to the rotating bezel portion 34b, as indicated by the solid arrow 92 in FIG. 4, and (via tab 82) also rightwardly drives the keyboard slide member 56 as indicated by the solid arrow 94 in FIG. 4.

Via the resulting interaction between the surfaces of the keyboard slide member slots 74 with the pins 62 the pins 62 are sequentially forced from the front ends 74a of the slots 74 rearwardly through the ramped slot portions 74b and into the rear ends 74a of the slots 74, thereby rearwardly driving the dome sheet 48 through its retraction stroke, as indicated by the solid arrow 96 and collapsing the keys 40. The monoblock tab slots 78, which receive upper ends of the pins 62, permit the pins 62 to move rearwardly but preclude the pins 62 (and thus the drive bar 54) from moving in a left-to-right direction as viewed in FIG. 4.

When the lid housing 30 is subsequently opened, the movements of the linkage structure 52 and the dome sheet 48 are reversed as indicated by the dashed arrows 90a, 92a, 94a and 96a in FIG. 4. Specifically, as the lid housing is initially opened the cylindrical bezel member 34b is rotated in the direction of the dashed arrow 90a. During the initial 60 degrees of pivotal lid housing opening movement the CPU cover slide member pin 84 is driven along the helixed bezel slot portion 60b toward the zero pitch slot portion 60a, thereby leftwardly driving the CPU cover slide member 58 and the keyboard slide member 56 as indicated by the dashed arrows 92a and 94a in FIG. 4. In turn, this forces the drive bar pins 62 forwardly along the keyboard slide member slots 74, thereby forwardly driving the dome sheet through its elevation stroke, as indicated by the dashed arrow 96a in FIG. 4, and elevating the keys 40 to their FIG. 2 solid line positions. After this occurs, the remainder of the lid housing pivotal opening movement (i.e., from 60 degrees to its hinge limit position of 135 degrees) imparts no further movement to the linkage structure components because the CPU cover slide member pin 84 is received in the zero pitch portion 60a of the bezel slot 60 during this final lid housing opening movement.

A variety of modifications can be made to the springless linkage structure 52 to customize it for a particular computer and its associated collapsible keyboard. For example, the ramp direction of the keyboard slide member slots 74 can be reversed if it is desired to have a forward motion of the dome sheet collapse the keys 40 and a rearward motion of the dome sheet elevate the keys. Additionally, the total travel distance of the drive bar 54 can be modified by simply changing the dimensions of the keyboard slide member slots 74. Moreover, if desired, the ramp angle of the helixed bezel slot portion 60b can modified to change the lid housing-to-linkage structure mechanical advantage characteristics. The lid opening and closing angles through which the linkage structure is forcibly driven by the rotating cylindrical bezel portion 34b may also be varied as desired.

In an alternate construction of the linkage structure (not shown) the CPU cover slide may be eliminated. The protrusion of the CPU cover slide member (i.e., the pin 84) which is received in the display bezel slot 60 is located instead on the keyboard slide member and protrudes upwardly through a slot in the keyboard chassis along the back area of the keyboard. The keyboard may be repositioned with respect to the display bezel portion 34b so that the protrusion engages in the bezel slot when the keyboard is installed in the computer.

The unique construction and operation of the springless linkage structure provides a variety of advantages over previously proposed structures for elevating and collapsing a portable computer's keyboard keys in response to opening and closing of the computer's lid housing. For example, the force to collapse and elevate the keys is supplied completely by the user's opening and closing of the computer lid. There is no dependency on spring force to effect the forward and rearward shifting of the dome sheet, and there is no residual force on the plastic linkage and dome sheet parts after the lid is opened or closed. More specifically, there is no force exerted by the mechanism on the keyboard for long periods of time during operating or storage conditions. Force is exerted on the keyboard only during brief moments when the keys are being collapsed or elevated. Thus, the risk of plastics bowing, fatiguing, etc. due to high stress is virtually eliminated.

When the lid housing 30 is opened, the receipt of the CPU cover slide member pin 84 in the zero pitch portion 60a of the display bezel slot 60 (see FIG. 4) advantageously functions to lock the keys 40 in their elevated orientations by precluding side-to-side movement of the CPU cover slide member 58. A further advantage of the springless linkage structure 52 is the provision of the non ramped end portions 74a of the drive bar member slots 74 (see FIG. 4). These non ramped slot end portions provide the drive bar member 56 with overtravel capabilities in both left and right directions as viewed in FIG. 4. This, in turn, provides a built-in tolerance for the dimensions and total movement distances of the keyboard slide member 56 and the CPU cover slide member 58.

The design of the linkage structure will work equally well with keyboards in which the dome sheet moves forwardly to elevate the keys and where the dome sheet moves rearwardly to elevate the keys. Thus, keyboards of both designs may be used interchangeably in the same portable computer by simply reversing the ramp direction in the keyboard slide member tab slots. The design will also work for keyboards with various required dome sheet travel distances as previously discussed herein.

The linkage structure also has a reduced number of parts, allows for customizable force profiles on the keyboard slide's slots to facilitate the implementation of preload on the keys, and has a design which is more favorable to an assembly method which allows the keyboard to be installed as the last part of the computer assembly process.

The foregoing detailed description is to be clearly understood as being given by way of illustration and example only, the spirit and scope of the present invention being limited solely by the appended claims.

What is claimed is:

1. For use with an electronic device having a pivotable lid portion with a rotatable hinge area section, collapsible keyboard apparatus comprising:

a plurality of keys supported for movement between elevated and retracted positions;

a drivable structure operative to (1) shift said keys from said retracted positions to said elevated positions and (2) permit said keys to move from said elevated positions to said retracted positions in response to movement of said drivable structure in a first direction respectively through (1) an elevation stroke and (2) a retraction stroke; and a springless drive linkage structure for interconnecting said drivable structure to the lid portion rotatable hinge area section in a manner using rotation thereof to move said drivable structure through said elevation and retraction strokes thereof.

2. The collapsible keyboard apparatus of claim 1 wherein said collapsible keyboard structure is a portable computer keyboard.

3. The collapsible keyboard apparatus of claim 2 wherein said portable computer keyboard is a notebook computer keyboard.

4. The collapsible keyboard apparatus of claim 1 wherein said drivable structure is a sheet member having, on a side thereof, a spaced series of resilient key return members.

5. The collapsible keyboard apparatus of claim 4 wherein said resilient key return members are elastomeric dome members.

6. The collapsible keyboard apparatus of claim 1 wherein said elevation and retraction strokes are oppositely directed.

7. The collapsible keyboard apparatus of claim 1 wherein said springless drive linkage structure includes:

a force exerting member associated with said drivable structure for movement relative thereto in a second direction transverse to said first direction, cooperating structures disposed on said force exerting member and said drivable structure and operable to move said drivable structure through said elevation and retraction strokes in response to opposite motions of said force exerting member in said second direction, and a connection structure, associated with said force exerting member, for connecting said force exerting member to the rotatable hinge area section in a manner utilizing rotation thereof to create movement of said force exerting member in said second direction.

8. Collapsible keyboard apparatus comprising:

a plurality of keys supported for movement in a keystroke direction between elevated and retracted positions;

a first structure operative to (1) shift said keys from said retracted positions to said elevated positions and (2) permit said keys to move from said elevated positions to said retracted positions in response to movement of said first structure in a first direction respectively through (1) an elevation stroke and (2) a retraction stroke, said first direction being transverse to said keystroke direction; and a second structure carried by said first structure and being movable relative thereto in a second direction perpendicular to said keystroke direction and said first direction, said second structure, during movement thereof relative to said first structure in said second direction, being operative to drive said first structure through a selected one of said elevation and retraction strokes thereof.

9. The collapsible keyboard apparatus of claim 8 wherein said collapsible keyboard apparatus is a portable computer keyboard.

10. The collapsible keyboard apparatus of claim 9 wherein said portable computer keyboard is a notebook computer keyboard.

11. The collapsible keyboard apparatus of claim 8 wherein:

one of said first and second structures has formed therein a slot, at least a portion of said slot being angled relative to said first and second directions, and the other of said first and second structures has formed thereon a projection which is slidingly received in said slot.

12. The collapsible keyboard apparatus of claim 11 wherein:

said first structure includes a sheet member having, on one side thereof, a spaced series of resilient key return members, and a drive member secured to said sheet member, said projection is disposed on said drive member, and said slot is formed in said second structure.

13. The collapsible keyboard apparatus of claim 11 wherein said slot has opposite end portions which extend generally parallel to said second direction.

14. An electronic device comprising:

a housing;

a lid mounted on said housing for pivotal movement relative thereto between open and closed positions, said lid having a rotatable hinge area section; and a collapsible keyboard carried by said housing and including:

a plurality of keys supported for movement between elevated and retracted positions, a drivable structure operative to (1) shift said keys from said retracted positions to said elevated positions and (2) permit said keys to move from said elevated positions to said retracted positions in response to movement of said drivable structure in a first direction respectively through (1) an elevation stroke and (2) a retraction stroke, and a springless drive linkage structure interconnecting said drivable structure to said hinge area section in a manner using rotation thereof to move said drivable structure through said elevation and retraction strokes thereof.

15. The electronic device of claim 14 wherein said electronic device is a portable computer.

16. The electronic device of claim 15 wherein said portable computer is a notebook computer.

17. The electronic device of claim 14 wherein said drivable structure is a sheet member having, on side thereof, a spaced series of resilient key return members.

18. The electronic device of claim 17 wherein said resilient key return members are elastomeric dome members.

19. The electronic device of claim 14 wherein said elevation and retraction strokes are oppositely directed.

20. The electronic device of claim 14 wherein said springless drive linkage structure includes:
a force exerting member associated with said drivable structure for movement relative thereto in a second direction transverse to said first direction,
cooperating structures disposed on said force exerting member and said drivable structure and operable to move said drivable structure through said elevation and retraction strokes in response to opposite motions of said force exerting member in said second direction, and
a connection structure, associated with said force exerting member, for connecting said force exerting member to said rotatable hinge area section in a manner utilizing rotation thereof to create movement of said force exerting member in said second direction.

21. The electronic device of claim 20 wherein:
said hinge area section has a cylindrical configuration with an external side surface slot formed therein and having a first, circumferentially extending longitudinal portion, and a second, helixed longitudinal portion, and
said connection structure has a projection disposed thereon and slidingly received in said slot.

22. The electronic device of claim 14 wherein said springless drive linkage structure is operative to move said drivable structure through said elevation stroke during only an initial pivotal opening movement of said lid, and to move said drivable structure through said retraction stroke during only a final pivotal closing movement of said lid.

23. The electronic device of claim 22 wherein during said initial pivotal opening movement and said final pivotal closing movement thereof said lid is pivoted through an arc of approximately 60 degrees.

24. An electronic device comprising:
a housing;
a lid mounted on said housing for pivotal movement relative thereto between open and closed positions; and
a collapsible keyboard carried by said housing and including:
a plurality of keys supported for movement between elevated and retracted positions,
a drivable structure movable in elevation and retraction directions to selectively move said keys between said elevated and retracted positions, and
springless linkage means, directly interconnected between said lid and said drivable structure for moving said drivable structure in said elevation and retraction directions in respective response to opening and closing said lid.

25. The electronic device of claim 24 wherein said electronic device is a portable computer.

26. The electronic device of claim 25 wherein said portable computer is a notebook computer.

27. The electronic device of claim 24 wherein:
said lid has a rotatable hinge area portion with an exterior side surface slot disposed therein and having an axially ramped portion, and
said springless linkage means have a projecting portion slidingly received in said slot.

28. The electronic device of claim 24 wherein said springless linkage means include:
a force exerting member associated with said drivable structure for movement relative thereto in a second direction transverse to said elevation and retraction directions, said force exerting member being connected to said projecting portion slidingly received in said slot, and
cooperating structures disposed on said force exerting member and said drivable structure and operable to move said drivable structure in said elevation and retraction directions in response to opposite motions of said force exerting member in said second direction.

29. The electronic device of claim 24 wherein said springless linkage means are operative to move said drivable structure in said elevation direction during only an initial pivotal opening movement of said lid, and to move said drivable structure in said retraction direction during only a final pivotal closing movement of said lid.

30. The electronic device of claim 29 wherein during said initial pivotal opening movement and said final pivotal closing movement thereof said lid is pivoted through an arc of approximately 60 degrees.

31. An electronic device comprising:
a housing;
a lid mounted on said housing for pivotal movement relative thereto between open and closed positions, said lid having a hinge area section rotatable about an axis during pivotal movement of said lid relative to said housing and having a side surface portion circumscribing said axis; and
a collapsible keyboard carried by said housing and including:
a plurality of keys supported for movement between elevated and retracted positions,
a drivable structure operative to (1) shift said keys from said retracted positions to said elevated positions and (2) permit said keys to move from said elevated positions to said retracted positions in response to movement of said drivable structure in a first direction respectively through (1) an elevation stroke and (2) a retraction stroke, and
a drive linkage structure interconnecting said drivable structure to said hinge area section in a manner using rotation thereof to move said drivable structure through said elevation and retraction strokes thereof, said drive linkage structure including a depression formed in said side surface portion of said hinge area section, said depression having a portion spiraled about said axis, and a projection carried by said drivable structure and being drivably received in said depression.

32. The electronic device of claim 31 wherein said electronic device is a portable computer.

33. The electronic device of claim 32 wherein said portable computer is a notebook computer.

34. An electronic device comprising:
a housing;
a lid mounted on said housing for pivotal movement relative thereto between open and closed positions; and
a collapsible keyboard carried by said housing and including:
a plurality of keys supported for movement between elevated and retracted positions in a keystroke direction,
a first structure operative to (1) shift said keys from said retracted positions to said elevated positions and (2) permit said keys to move from said elevated positions to said retracted positions in response to movement of said first structure in a first direction respectively through (1) an elevation stroke and (2) a retraction stroke, said first direction being transverse to said keystroke direction,
a second structure carried by said first structure and being movable relative thereto in a second direction perpendicular to said keystroke direction and said first direction, said second structure, during movement thereof relative to said first structure in said second direction, being operative to drive said first structure through a selected one of said elevation and retraction strokes thereof, and a third structure interconnecting said lid and said second structure and being operative, during pivotal movement of said lid relative to said housing, to move said second structure in said second direction relative to said first structure.

35. The electronic device of claim 34 wherein said electronic device is a portable computer.

36. The electronic device of claim 35 wherein said portable computer is a notebook computer.

* * * * *